Feb. 25, 1969     J. F. SALHOFER     3,429,959
METHOD OF MAKING FOILS OF THERMOPLASTIC SYNTHETIC MATERIALS
Filed Oct. 24, 1965
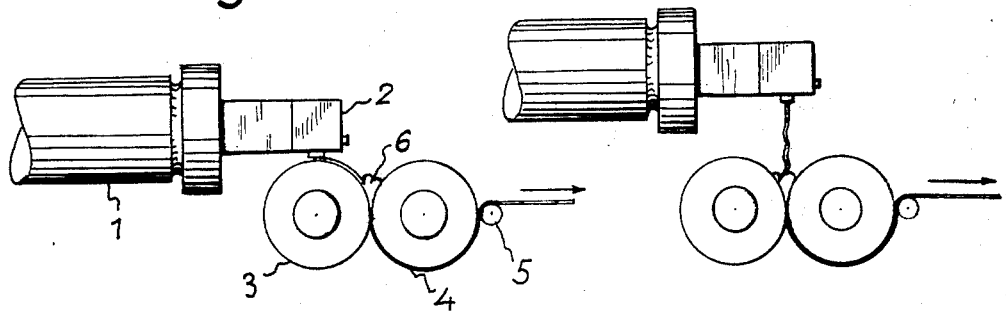
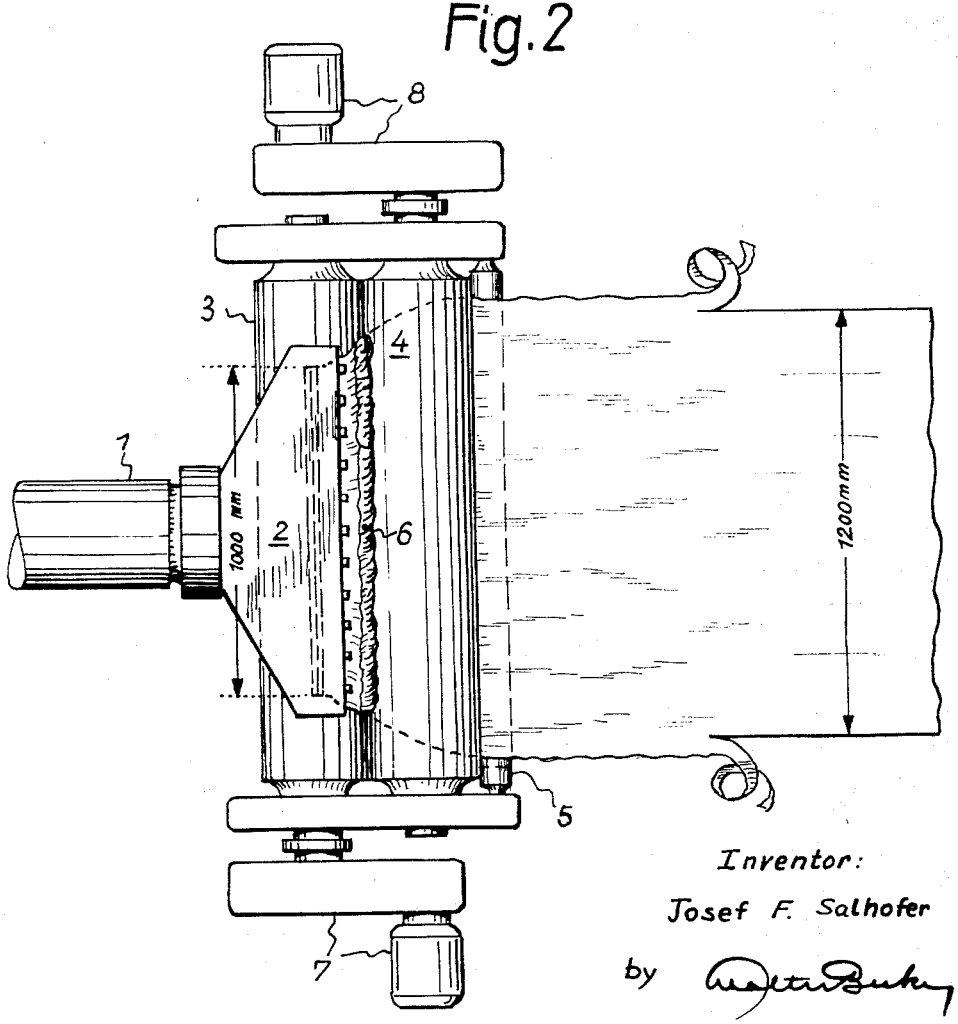
Inventor:
Josef F. Salhofer

United States Patent Office 3,429,959
Patented Feb. 25, 1969

3,429,959
METHOD OF MAKING FOILS OF THERMO-PLASTIC SYNTHETIC MATERIALS
Josef Ferdinand Salhofer, Krefeld, Germany, assignor to Joh. Kleinewefers Sohne, Krefeld, Germany
Continuation-in-part of application Ser. No. 208,374, July 9, 1962. This application Oct. 24, 1965, Ser. No. 504,659
Claims priority, application Germany, July 11, 1961, K 44,219
U.S. Cl. 264—175          3 Claims
Int. Cl. B29d 7/14

ABSTRACT OF THE DISCLOSURE

A method of making homogeneous stretchable foils of hard macro-molecular synthetic materials, which includes the steps of: continuously extruding a wide web of said synthetic material, passing the thus obtained foil over the shortest distance to and between drawing rollers for further rolling out said foil while adjusting the working speed of said rollers in such a way that a kneading mass of the synthetic material continuously forms in the space between said rollers.

---

The present application is a continuation-in-part application of my copending application Ser. No. 208,374 filed July 9, 1962 and now abandoned.

The present invention relates to a method of making foils, especially foils having a thickness from 0.03 millimeter to 1.5 millimeters, of thermoplastic synthetic materials for various fields of employment. When making deep drawn wrapping containers, for instance, of hard polyvinyl chloride, it is necessary that the foils employed therefor have no molecular orientation. Of similar importance is the freedom of molecular orientations for foils of soft polyvinyl chloride regardless of their employment.

It is known to produce foils of thermoplastic synthetic materials according to various methods, viz. by casting, the blow method (extruder with round nozzles), by the flat foil method (extruder with flat or wide-slot nozzle), and by the calendering method. Foils without molecular orientation can, according to the heretofore known state of the art, be produced in a proper way only according to the calendering method and according to the casting method. Both require a relatively high financial outlay and a considerable number of machines. Thus, when employing a calender, a considerable number of pairs of rollers is required in order to obtain the desired width and thickness of the foil.

It is therefore an object of the present invention to provide a method which will make it possible to produce foils with the above-mentioned specific properties, at a considerably reduced cost over heretofore known methods.

It is another object of the present invention to make possible the economical production of homogeneous molecularly non-oriented foils of polyethylene, polystyrene, and polyvinyl chloride.

A still further object consists in the economical production of molecularly non-oriented foils of non-crystalline, hard marco-molecular synthetic materials of low viscosity.

It is a still further object of the present invention to make possible the economical production of non-oriented foils of the above-identified type, which are adapted to be deep-drawn.

It is another object of this invention to provide a simplified apparatus for carrying out the method as set forth in the preceding paragraphs.

These and other objects and advantages of the invention will appear more clearly from the following specification in connection with the accompanying drawing, in which:

FIGURE 1 diagrammatically illustrates an apparatus for carrying out the method according to the present invention;

FIGURE 2 shows a top plan view of the apparatus of FIGURE 1;

FIGURE 3 illustrates an apparatus similar to that of FIGURE 1 but differing therefrom in that the position of the extruder nozzle relative to the rollers has been changed.

The problem of making molecular non-oriented foils of thermoplastic synthetic materials has been solved according to the present invention, by feeding the granulate of the synthetic material into the hopper of an extruder provided with a flat nozzle or die. The plastic mass passing through the flat nozzle is in its entire width fed to a rolling mill unit comprising from two to three rollers. The rollers of said rolling mill unit are heated up to temperatures which are located within the thermoplastic range of the synthetic material being employed, i.e. above or at the temperature in which the synthetic material is transformd into its viscous state. The width of the gap between the last two rollers of the two or three-roller calender corresponds to the desired thickness of the foil being produced.

The band produced by the extruder and the flat nozzle, in cusomary manner, has a width which is narrower than the end width of the foil taken from the rolling mill unit, and, more specifically, is narrower than said foil by from 10 to 20 percent. At the extruder and at the flat nozzle, such a high temperature is employed that the band-shaped material being extruded will already be in a thermoplastic condition. The thickness of the extruded flat foil has, in conformity with the present invention, to be greater by at least 50% than the thickness of the finished foil. The flat foil will, at the maximum distance possible, pass from the nozzle of the extruder to the first roller of the rolling mill unit.

The speed of this roller must be variable in a stepless manner so that the foil on its way from the nozzle to this roller will be drawn in such a way that its thickness corresponds to the thickness of the completed foil. The material on the first roller of the rolling mill unit is drawn into the first roller gap of the rolling mill unit while being subjected to a kneading action.

Since, as emphasized above, the roller temperatures are kept within the thermoplastic range of the material being processed, a relatively low viscous kneaded mass rotating in itself will be obtained. The second roller of the rolling mill unit is rotated at a somewhat higher speed than the first roller so that the foil forming after the gap, will be carried along by the second roller and will stick somewhat to the latter. Depending on the material being processed the ratio of the speed of the second roller with regard to that of the first roller is within the range of from 1.1 to 2. Since the required differential speed between the two rollers must be of different magnitude for different synthetic materials, foil thicknesses and temperatures, it is necessary that this differential speed be variable in a stepless manner.

Ordinarily, the arrangement of two rollers in the manner mentioned above will suffice for properly producing foils. For difficult materials as, for instance, hard polyvinyl chloride with a high molecular value, it is advantageous to employ a third roller. In front of the gap between the second and third roller there will, again, form a rotating kneaded mass of relatively low viscosity. The third roller will, with variable differential speed over the second roller viz. at a ratio within the range of from 1.0 to 1.1, be so operated that the foil forming after the gap will cling to the third roller and can be taken off from the latter. The principle of the method is not changed or affected by the number of the rollers involved.

The foil taken off from the respective third roller is cooled to such an extent that it will have sufficient form stability for the further transport of the foil. In order to remove any possible remaining molecular orientation, the thus obtained foil may be fed to a highly heated roller and after passing over the same, may be cooled again. This melting roller will, for this de-shrinking process, be kept at a temperature which is located within the thermoplastic range of the material being processed. After the foil has passed the melting roller, it may either be directly wound upon a reel or it may be fed to a stretching device for longitudinal and/or transverse stretching, or it may be fed to a simultaneous, biaxial, stretching unit. However, it is also possible to add any other appropriate post-treating apparatus.

Referring now to the drawing in detail, the arrangement illustrated therein comprises a worm press 1 from which the hard synthetic material passes through a wide-slot nozzle 2 in form of a wide foil into the gap of a rolling mill unit comprising rollers 3 and 4. From here the foil passes over a withdrawing roller 5 for further treatment or winding-up operation. The working speed of the pulling rolling mill unit 3 and 4 is, with regard to the extrusion speed of the foil, so controlled that a pool of rotating mass or kneaded mass 6 will form in a continuous manner in the roller gap. In addition thereto, in order to prevent the foil from sticking to roller 3, the speed of roller 4 is adjustable with regard to the speed of roller 3 by changeable speed gear-drives 7 and 8 in such a way that a speed difference of from 10% to 100% is obtained. The rollers of the pulling rolling mill unit are heated in a manner known per se and are additionally variable as to speed in very fine stages.

With the embodiment illustrated in FIG. 1 of the drawing, the wide-slot nozzle 2 is so arranged that the foil, prior to entering the roller gap, moves over approximately 90° of roller 3 so as to be heated up by the roller, depending on the quality of the goods to be produced, however, also an arrangement is possible according to which the exit mouthpiece of the wide-slot nozzle is located precisely above the roller gap so that the foil will directly cover a minimum distance, pass into the roller gap, as shown in FIG. 3.

For the manufacture of foils of crystalline synthetic materials, especially of foils being very hard and having a high melting point, a cooling system known per se, comprising one or more rollers may be employed in order completely to prevent the formation of, or permit a limited formation only of a crystalline structure clouding the material.

As will be evident from the above description, the present invention contemplates the combination of an extruder with a calender which requires a limited number of rollers only. The mass of synthetic material homogenized in the extruder or worm press in customary manner is passed from the wide-slot nozzle into the nip formed by two rotating rollers in the form of a wide band so that these rollers do not have to spread out the mass of synthetic material. In this way it is sufficient to equip the rolling mill with two rollers only. The rollers are as mentioned above, heated to a temperature which is close to the transformation point or transition point of the synthetic material, and the mass is brought into the nip between the two rollers over the shortest possible distance so as to encounter the least possible cooling. In this way, a highly plasticized rotating kneaded mass or pool of rotating mass is formed. Furthermore, the speed of rotation of the two rollers is such that always this rotating kneaded mass is present in the nip of the rollers.

The method according to the present material has proved particularly advantageous in the production of molecularly non-oriented foils having a thickness of from 0.05 to 0.1 millimeter, of hard polyvinyl chloride, for wrapping purposes.

For the sake of completeness, a short reference to the prior art may be in order. With heretofore known methods, unoriented foils of synthetic material could be produced only by calendering or by casting. In the calendering method the starting material was bulk material or a thick and very narrow strand fed into the gap between two rollers, and the material was rolled out by a large number of rollers, usually four or more, arranged in series. The great number of rollers was just necessary, because the bulk material can be extended and spread to the desired width and thickness, only by a long passage through a plurality of gaps. In each pair of co-operating rollers one roller was rotated with a slightly higher speed, which customarily amounted to about 10%, in order to prevent sticking of the foil to the "wrong" roller, i.e. that roller which was not followed by the next pair of rollers of the calender.

In contrast to the heretofore very expensive big calender with four or more rollers, the production of non-oriented foils is now, according to the present invention, made possible by a considerably cheaper process by using an extruder with wide slot nozzle in combination with a simple two-roller calendering set. The material is fed into the gap between the two rotating rollers not as bulk material but as an extruded wide foil which has already a width corresponding approximately to the width of the desired foil. Due to the fact that one of the two rollers rotates at a speed which is between 10 and 100% greater than that of the second roller, a rotating kneaded mass is formed in the gap between the two rollers, thus obtaining the effect of a big calender and eliminating any orientation of the molecules in the extruded foil.

The following examples are given to illustrate the invention, thereby being not intended as limiting.

Example 1

A dry blend powder of a linear tetrapolyethylene of crystalline structure of a melt index 2.0 (density 0.92) specific weight 0.952 g./cm.$^3$ (molecular weight about 60,000), a shore hardness of Durometer A=70 was fed into an extruder and homogenized therein. The resin mass left the flat nozzle with an exit speed of 6 meters p./min. and had a width of 1,000 mm. and a thickness of 1.1 mm.

This foil was passed between two calendar rollers having a diameter of 300 mm., a length of 1400 mm., and a temperature of 170° C. The gap between the rollers was 0.32 mm. The roller 3 had a circumferential speed of 23 m./min., whereas the speed of roller 4 was 37 m./min. Now and then, a slight change in the rotating speed of the two rollers with regard to the extrusion speed was effected in order to maintain an approximately constant amount of rotating kneaded mass in the nip between the rollers.

The finished foil left roller 4 with a thickness of 0.3 mm. and, after trimming of the edges, had a width of 1200 mm. (see FIGURE 3). It was then air-cooled without tensioning and finally wound up on a roll.

Example 2

The extruder was charged with pellets of plasticized polyvinyl chloride, without any additives, specific weight 1.38 g./cm.$^3$ (molecular weight approximately 300,000), share hardness 93.

The opening of the flat nozzle was 1 mm. The temperature was about 30° C. beyond the decomposition point and varied between 220 and 227° C.

The width of the roller gap was 0.28 mm., the two rollers were heated to 200° C., and the roller 4 had a speed of 40 m./min. The other conditions and the further treatment of the final foil corresponded to that of Example 1.

It is, of course, to be understood, that the present invention is, by no means, limited to the particular method described, nor to the devices shown in the drawing, but comprises any modifications within the scope of the appended claims.

What I claim is:

1. A method of making non-oriented, homogenous stretchable foils of hard macro-molecular synthetic material which includes the steps of: continuously extruding said synthetic material through a flat nozzle in a band nearly 90% of the width of the ready-made foil to drawing rollers maintained at a temperature in the thermoplastic range of said material for further rolling out said foil, adjusting the working speed of said rollers so that they have a speed differential of 10% to 100% and a kneading mass of said material is maintained in the space between said rollers, and said rollers expand said foil to its full width on passing through said rollers.

2. A method of making non-oriented, homogeneous stretchable foils of hard polyvinyl chloride which includes the steps of: continuously extruding such material at a temperature within the thermoplastic range of said material through a flat nozzle to form a band which is 10% to 20% narrower than the completed foil to drawing rollers, each of which is at a temperature within the thermoplastic range of said material, for rolling out said foil, rotating said rollers at a working speed that will maintain a kneading mass of said material in the space between said rollers and at a differential speed of said rollers not greater than 1:2, said rollers drawing said foil through said rollers and rolling it to the width of the completed foil without orienting the molecular structure of the foil.

3. The method of making foils claimed in claim 2, in which said rollers rotate at a differential in speed of 1:1.1 to 1:2.

No references cited.

ROBERT F. WHITE, *Primary Examiner.*

G. AUVILLE, *Assistant Examiner.*

U.S. Cl. X.R.

264—210, 216